US010983489B2

(12) United States Patent
Jennings et al.

(10) Patent No.: US 10,983,489 B2
(45) Date of Patent: Apr. 20, 2021

(54) SYSTEMS AND METHODS FOR HARMONIC ANALYSIS OF SOIL

(71) Applicant: FarmX Inc., Mountain View, CA (US)

(72) Inventors: William E. Jennings, San Jose, CA (US); Zachary Gentry, Oakland, CA (US)

(73) Assignee: FarmX Inc., Mountain View, CA (US)

( * ) Notice: Subject to any disclaimer, the term of this patent is extended or adjusted under 35 U.S.C. 154(b) by 0 days.

(21) Appl. No.: 16/588,617

(22) Filed: Sep. 30, 2019

(65) Prior Publication Data

US 2020/0026250 A1 Jan. 23, 2020

Related U.S. Application Data

(63) Continuation of application No. 15/801,242, filed on Nov. 1, 2017, now Pat. No. 10,509,378.
(60) Provisional application No. 62/418,675, filed on Nov. 7, 2016.

(51) Int. Cl.
| | |
|---|---|
| *G05B 15/02* | (2006.01) |
| *A01G 25/16* | (2006.01) |
| *B05B 12/12* | (2006.01) |
| *G06K 9/00* | (2006.01) |
| *G06Q 50/02* | (2012.01) |

(52) U.S. Cl.
CPC ............ *G05B 15/02* (2013.01); *A01G 25/16* (2013.01); *B05B 12/12* (2013.01); *G06K 9/00657* (2013.01); *G05B 2219/2625* (2013.01); *G06Q 50/02* (2013.01); *Y02A 40/10* (2018.01)

(58) Field of Classification Search
CPC ............ G05B 15/02; G05B 2219/2625; A01G 25/16; B05B 12/12; G06K 9/00657; Y02A 40/50; G06Q 50/02; G01N 29/036

USPC .......................................................... 700/284
See application file for complete search history.

(56) References Cited

U.S. PATENT DOCUMENTS

| | | |
|---|---|---|
| RE31,023 E | 9/1982 | Hall, III |
| 4,590,477 A | 5/1986 | Regnier et al. |
| 4,654,598 A * | 3/1987 | Arulanandan ....... G01N 27/223 |
| | | 324/347 |
| 5,418,466 A | 5/1995 | Watson et al. |
| 5,445,178 A | 8/1995 | Feuer |
| 6,014,029 A | 1/2000 | Soto et al. |
| (Continued) | | |

FOREIGN PATENT DOCUMENTS

| | | |
|---|---|---|
| WO | WO2016110832 A1 | 7/2016 |
| WO | WO2018085452 A1 | 5/2018 |

OTHER PUBLICATIONS

EnviroSCAN Probe, [retrieved on Dec. 14, 2016], Retrieved from the Internet: <URL:http://www.sentek.com.au/products/enviro-scan-probe.asp>, 3 pages.

(Continued)

*Primary Examiner* — Rocio Del Mar Perez-Velez
*Assistant Examiner* — Alicia M. Choi
(74) *Attorney, Agent, or Firm* — Carr & Ferrell LLP

(57) ABSTRACT

Systems and methods for harmonic analysis of soil are provided herein. Some methods include converting a first frequency of an operating signal into a second, higher frequency relative to the first frequency to create a stimulating signal, transmitting the stimulating signal into soil, and determining attenuation based on a comparison of a responsive signal and the operating signal.

15 Claims, 11 Drawing Sheets

(56) References Cited

U.S. PATENT DOCUMENTS

| | | | |
|---|---|---|---|
| 6,720,908 | B1 | 4/2004 | Puglia |
| 6,891,444 | B2 | 5/2005 | Jacobsson et al. |
| 6,977,351 | B1 | 12/2005 | Woytowitz |
| 7,836,910 | B2 | 11/2010 | Dresselhaus et al. |
| 8,682,494 | B1 | 3/2014 | Magro et al. |
| 10,509,378 | B2 | 12/2019 | Jennings et al. |
| 10,533,956 | B2 | 1/2020 | Jennings |
| 2002/0170229 | A1 | 11/2002 | Ton et al. |
| 2004/0145379 | A1 | 7/2004 | Buss |
| 2004/0239338 | A1* | 12/2004 | Jonsson ............... G01N 22/04 324/642 |
| 2006/0057997 | A1 | 3/2006 | Hausdorf et al. |
| 2006/0144437 | A1 | 7/2006 | Dresselhaus et al. |
| 2006/0227661 | A1* | 10/2006 | Shook ..................... G01V 1/40 367/47 |
| 2009/0326723 | A1 | 12/2009 | Moore et al. |
| 2010/0257633 | A1 | 10/2010 | Pogson et al. |
| 2012/0084115 | A1 | 4/2012 | Cline et al. |
| 2012/0306257 | A1* | 12/2012 | Silversides ............ G01N 21/31 299/18 |
| 2013/0341420 | A1 | 12/2013 | Lister et al. |
| 2014/0088770 | A1 | 3/2014 | Masters et al. |
| 2014/0117468 | A1 | 5/2014 | Parris et al. |
| 2014/0326801 | A1 | 11/2014 | Upadhyaya et al. |
| 2015/0081058 | A1 | 3/2015 | Oliver et al. |
| 2015/0247787 | A1 | 9/2015 | Yeomans |
| 2015/0268218 | A1 | 9/2015 | Troxler |
| 2015/0278719 | A1 | 10/2015 | Schueller et al. |
| 2015/0301536 | A1 | 10/2015 | Martinez |
| 2016/0037709 | A1 | 2/2016 | Sauder et al. |
| 2016/0135389 | A1 | 5/2016 | Ersavas et al. |
| 2016/0183484 | A1 | 6/2016 | Richings, Sr. et al. |
| 2016/0202227 | A1 | 7/2016 | Mathur et al. |
| 2017/0108452 | A1* | 4/2017 | Carlson ................ G01S 13/751 |
| 2017/0172077 | A1 | 6/2017 | Wouhaybi et al. |
| 2017/0176572 | A1* | 6/2017 | Charvat .................. H01Q 1/38 |
| 2017/0311559 | A1 | 11/2017 | Ebert et al. |
| 2018/0080861 | A1 | 3/2018 | Lafian |
| 2018/0129175 | A1 | 5/2018 | Jennings et al. |
| 2018/0146631 | A1 | 5/2018 | Haran et al. |
| 2018/0146632 | A1 | 5/2018 | Meron |
| 2018/0164230 | A1 | 6/2018 | Jennings |
| 2018/0164762 | A1 | 6/2018 | Mewes et al. |
| 2018/0202988 | A1 | 7/2018 | Jennings |
| 2018/0252694 | A1 | 9/2018 | Mase et al. |
| 2018/0259496 | A1 | 9/2018 | McPeek |
| 2020/0068784 | A1 | 3/2020 | Oaklander et al. |

OTHER PUBLICATIONS

Liquid Sensing at Radio Frequencies, Complex impedance measurement of liquid samples as a function of frequency, [retrieved on Jan. 13, 2017] Microwave Journal, Thomas J. Warnagiris, Sep. 1, 2000, (http://www.microwavejournal.com/articles/3038-liquid-sensing-at-radio-frequencies), 9 pages.

"International Search Report" and "Written Opinion of the International Searching Authority", Patent Cooperation Treaty Application No. PCT/US2017/059597, dated Jan. 25, 2018, 9 pages.

Berni et al., "Mapping Canopy Conductance and CSWI in Olive Orchards Using High Resolution Thermal Remote Sensing Imagery", in: Remote Sensing Environment 113 [online], Jun. 28, 2009 [retrieved on Jan. 4, 2018], Retrieved from the Internet: <URL:https://www.sciencedirect.com/science/article/pii/S0034425709002090>, pp. 2380-2388.

Smith, Adam Brook, "Soil Moisture Monitoring with Ground-Based Gravity Data," Dissertation University of Melbourne, Department of Infrastructure Engineers, 2013, 397 pages.

* cited by examiner

SYSTEMS AND METHODS FOR HARMONIC ANALYSIS OF SOIL

CROSS REFERENCE TO RELATED APPLICATIONS

This application is a continuation of U.S. application Ser. No. 15/801,242, filed on Nov. 1, 2017, which issued as U.S. Pat. No. 10,509,378, on Dec. 17, 2019, which claims the benefit and priority of U.S. Provisional Application Ser. No. 62/418,675, filed on Nov. 7, 2016, each of which is hereby incorporated by reference herein in their entireties including all references and appendices cited therein, for all purposes.

FIELD OF THE TECHNOLOGY

The present technology relates generally to farm irrigation, and more specifically, but not by limitation to multimodal irrigation systems and methods for improving irrigation for various plants, trees, and other flora in a farm in order to improve farm performance. Some embodiments are directed to soil sensors that detect the presence of clay within soil using harmonic frequencies.

SUMMARY OF THE PRESENT TECHNOLOGY

According to some embodiments, the present disclosure is directed to a method comprising selecting a first frequency for an operating signal used by a sensor, converting the first frequency of the operating signal into a second frequency of the first frequency to create a stimulating signal, the second frequency being a harmonic of the first frequency, transmitting the stimulating signal into soil, and determining attenuation using a responsive signal, the attenuation being indicative of clay within the soil.

According to some embodiments, the present disclosure is directed to a harmonic sensor circuit that produces an operating signal at a first frequency and emits a stimulating signal at a second frequency that is a harmonic of the first frequency; a processor; and a memory for storing executable instructions, the processor executing the instructions to: control the harmonic sensor circuit to emit the stimulating signal into soil; and determine attenuation of the stimulating signal in the soil based on an analysis of a responsive signal that have been converted back in to the first frequency relative to the operating signal.

According to some embodiments, the present disclosure is directed to a method comprising converting a first frequency of an operating signal into a second, higher frequency relative to the first frequency to create a stimulating signal; transmitting the stimulating signal into soil; and determining attenuation based on a comparison of a responsive signal and the operating signal.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1:
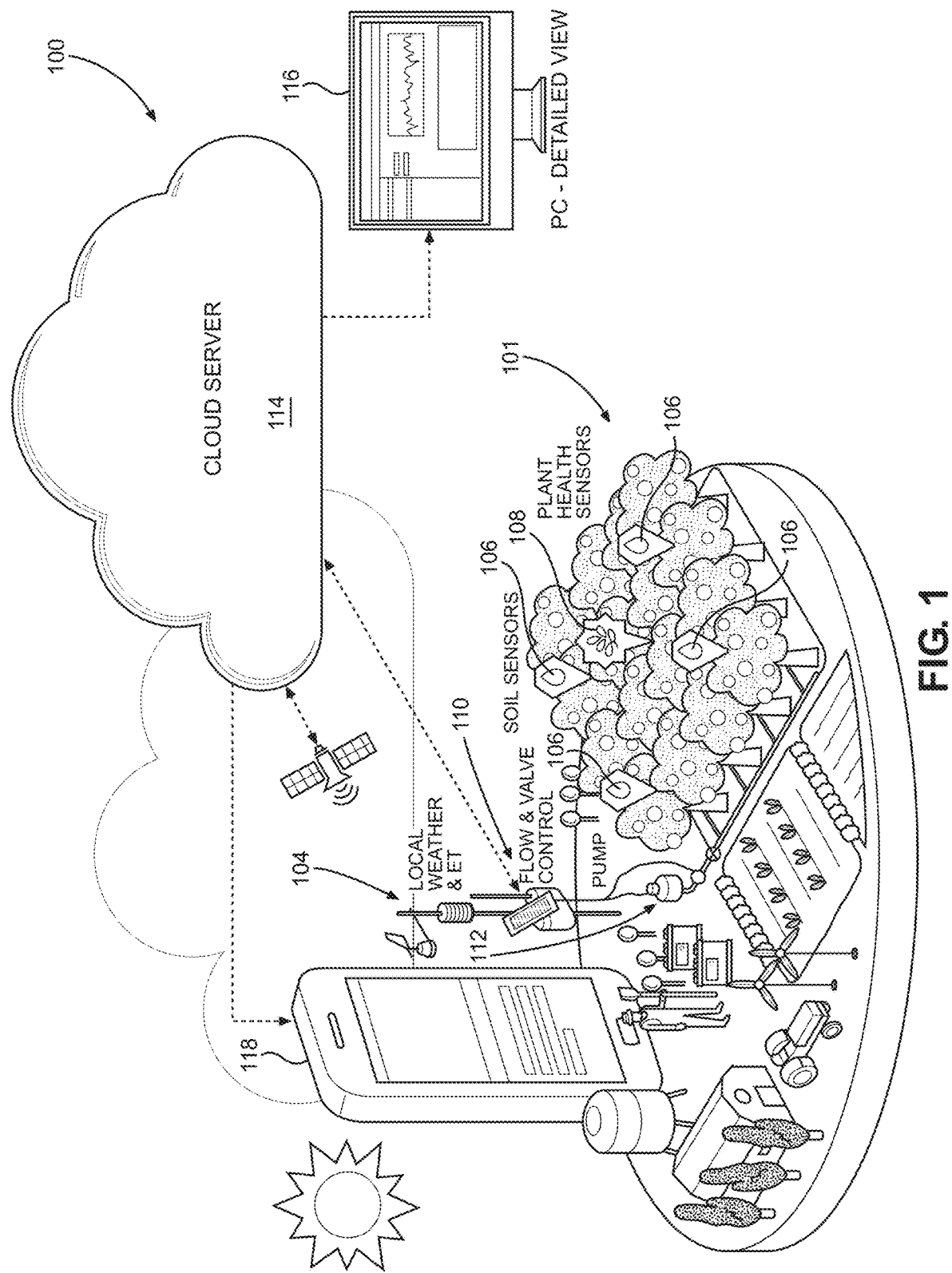
FIG. 1 is a perspective view of an example environment and system for practicing aspects of the present disclosure.

According to some embodiments, the present disclosure provides solutions to increase farm efficiency and profitability by reducing water, pesticide, and other resource consumption and increasing yield. The systems and methods herein utilize rich data, analytics and machine learning platforms.

Generally described, the systems herein comprise instrumenting a farm (with one or more target areas) with in-field sensors such as subterranean, on-plant, and atmospheric, which collect highly granular and accurate farm data. Some sensors are specifically deployed, such subterranean sensors that are located various in at differing soil depths to obtain highly granular moisture data from adjacent soil. Using this highly granular and detailed information, accurate predictive analytics and modeling related to farm health, plant health, water usage, can be realized. These analytics and modeling can be utilized to selectively adjust irrigation through automatic pump and/or valve actuators and transducers.

These systems and methods can also accurately calculate stem water potential without the need to harm plants through sampling and cutting, and also eliminates subjective human error that is commonplace. That is, rules established for the systems of the present disclosure provide convert objective measurements of soil, plant, and atmospheric conditions obtained in real-time, into actionable metrics and models that allow for selective control of irrigation systems. For example, using fixed depth subterranean sensors that measure soil temperature, moisture, and salinity, water flow rates and porosity of soil can be inferred. These models are used to intelligently select irrigation schedules for a target area of a farm.

The present disclosure leverages discovery of a set of plant health metrics using data from tree circumference, soil moisture and weather to predict stem water potential (SWP) with accuracy. The machine learning aspects of the present technology allow for accuracy of the SWP calculations to improve over time.

Systems of the present disclosure also provide a pest detection engine that analyzes weather patterns to predict pest and disease pressure across the farm. A chemical spray can cost thousands of dollars and failure to identify pests can create a catastrophic loss.

All components of these systems are extensible and can interface with other field measurements, sources, and these components can be integrated into the systems and methods of the present disclosure.

Many farm practices require timely and accurate weather information. The present disclosure ensures timely microclimate data. Farms, such as orchards are composed of some of the most complex plants in agriculture. Their effective root zone extends many feet into the soil requiring monitoring of soil temperature, water content, and salinity at many depths. Subterranean, fixed depth sensors are used to measure these values at varying depths in a target area. Sensor data from these sensors can be used to calculate accurate soil porosity, soil moisture, percolation (e.g., flow) rates, and so forth.

The present disclosure also provides systems that monitor both leaf wetness, and the dynamic changes of trunk circumference of a plant such as a tree. By monitoring diurnal change of the plant's size, the systems of the present disclosure can use the trees as the most accurate sensor of the target area available: the trees themselves. Plant health sensors also enable forecasting needs for irrigation, and probability of which pests, and when they may be in the target area.

In some embodiments, the systems and methods disclosed herein utilize canopy imaging. For example, low-altitude imagery analytics provide insight about field and plant health for non-permanent crops. These metrics can be used to inform the systems of the present disclosure about irrigation, fertilizer, plant stress, pests, disease, and irrigation system maintenance. Additionally, the image data collected can be used to train the systems to generate future yield prediction. In another embodiment, high-altitude data analytics provide insight into industry wide crop health, stress and yield predictions. In some embodiments, both low and high altitude images are utilized.

The systems of the present disclosure are also configured to selective and automatically control operation of irrigation systems on the farm (e.g., target area) based on the analytics related to soil parameters, weather parameters, aerial imaging, and so forth. To be sure, irrigation controls are necessary to control water usage on a granular level. These allow precision targeting of water and fertilizer, at a level of 1-10 trees, for example. Irrigation control allows for minimization of waste while maximizing yield, as well as automating farm processes. The systems and method herein can selectively adjust pumps and/or valves of an irrigation system to increase and/or decrease the flow of water to a target area based on the robust analytics and modeling described herein.

In sum, the present disclosure provides an integrated management platform that allows farmers to automatically control irrigation, as well as optimize irrigation and fertilizer decisions, predict pest and disease infestation and suggest appropriate mitigation, analyze financial impact of pest and disease infestation, predict yield and market price of crop, and suggest hedges against variance, allow farmers to visualize all key data about their farmland, and connect farmers to key suppliers such as pest control agencies—just to name a few.

FIG. 1 illustrates a perspective view of an example system of the present disclosure. The system 100 is configured to operate in a target area 101, for example an orchard on a farm. The system 100 generally comprises a base station, a weather station 104, a plurality of subterranean soil sensors 106, a plurality of plant health sensors 108, irrigation control (flow and valve control) 110 inside the base station, and one or more valve or pumps 112 that control an irrigation system. Analytics included in the system 100 can be implemented at the base station or in a cloud server 114. Users can access the system 100 through terminals such as terminal 116 or terminal 118.

In general, the system 100 includes sensors, data analytics, and closed loop control of the irrigation system. The system 100 implements one or more algorithms that optimize water usage, and time the water is applied to the farm (irrigation schedules). This algorithm factors in cost of water, cost of electricity, health of the plant, moisture in the soil (obtained using the subterranean sensors described infra), salinity of the soil, local micro-climate (weather), and preferred cultural factors that each farmer employs.

In some embodiments, the system has the ability to forecast (estimate) future plant health based on water stress, by for example, correlating data from plant, weather, and soil to SWP.

Another challenge in standard practices is a dependency on very sparse data and a lack of a structured system for confirming sensor data integrity and consistency with other indications on the same farm.

By modeling a water cycle and usage on the farm (target area) understanding source of water (rain and flow meter), flow of water under the ground (moisture sensors), use of water within the plant (plant sensors), local evaporation on the farm (micro-climate), the system is aware of every element of the water cycle in the target area. With this holistic representation of the target area, the systems of the present disclosure can detect inconsistency in sensor readings such that even soft failures that can be the result of an intermittent issue.

By way of example, if the system senses rain and/or water flow, and the subterranean sensors are not sensing moisture entering the soil, and/or plant health sensors are not sensing plant water usage, the system can accurately assess soil moisture sensor operation is not consistent.

In another example, when deploying more sensors in a farm than a single instance of any type of sensor, the system can be configured to validate that each sensor returns values that are close in value to each other, as the system is installed in a similar micro-climate, and under the same irrigation management processes. Any major difference between sensors represents either faulty sensors, or a need for the farmer to take action to achieve better water consistency in the field. The system can implement thresholds are set relative to crop type and current irrigation practices in use. Again, these parameters such as current irrigation practices can be directly measured in real-time using the systems of the present disclosure.

In yet another example, the system can utilize weather information for each region provided by a government (for example in California data is available through C.I.M.I.S.), and compare that weather information to the local microclimate. Differences are noted, and if they trend consistently, such information indicates a need to validate a sensor before actions are taken in a closed loop system, such as those disclosed herein.

Again, these direct, closed loop systems provide direct and automatic control of the irrigation flow and schedule based on the sensors and data obtained by the system.

The system calculates an overall farm health score, and as such, creates a structure than enables systemic changes to cultural practices to improve overall farm health and business profitability. Data from multiple sources, both proprietary and third party, are factored together to create this health score. An overall process for calculating a health score is provided with respect to FIG. 4.

In general, the system can implement a highly granular acre block resolution plant health/stress analysis engine that evaluates water stress, chemical stress, pest stress, yield prediction, and the like. The system can also comprise a highly granular block resource recommendation engine that provides for target area water needs, potential remediating actions, user-enabled action or automation, chemical needs, potential actions, user-enabled action or automation, pesticide, biomarker needs, potential actions, user-enabled action or automation, public satellite imagery data source ingestion, potential actions, user-enabled action or automation, public weather and environmental data source ingestion. The system can also be adapted to allow for public soil data ingestion, user enabled data share permissions with U.C.C.E. farm advisers, and provide for aggregated private data based analytics.

The system can accept user inputs such as field coordinates (target area coordinates), crop type, crop genetics, and source, as well as historical and/or predictive information such as environmental and/or field instrumentation data, cultural practices, crop yield, and so forth.

The system can provide reports such as crop yield prediction, which involves environmental stimuli based yield output, water recommendations such as watering control/recommendation based off of local weather patterns, crop water requirements, and field available water content. The system can also provide fertilizer recommendations such as nutrient needs based off of irrigation needs and predicted yield. Pesticide recommendations based on risk of infestation, risk level, and methods to verify infestation can also be provided. Also, alerts for weather issues such as frost, flood, and heat stress can be output by the systems of the present disclosure.

Figure 2:
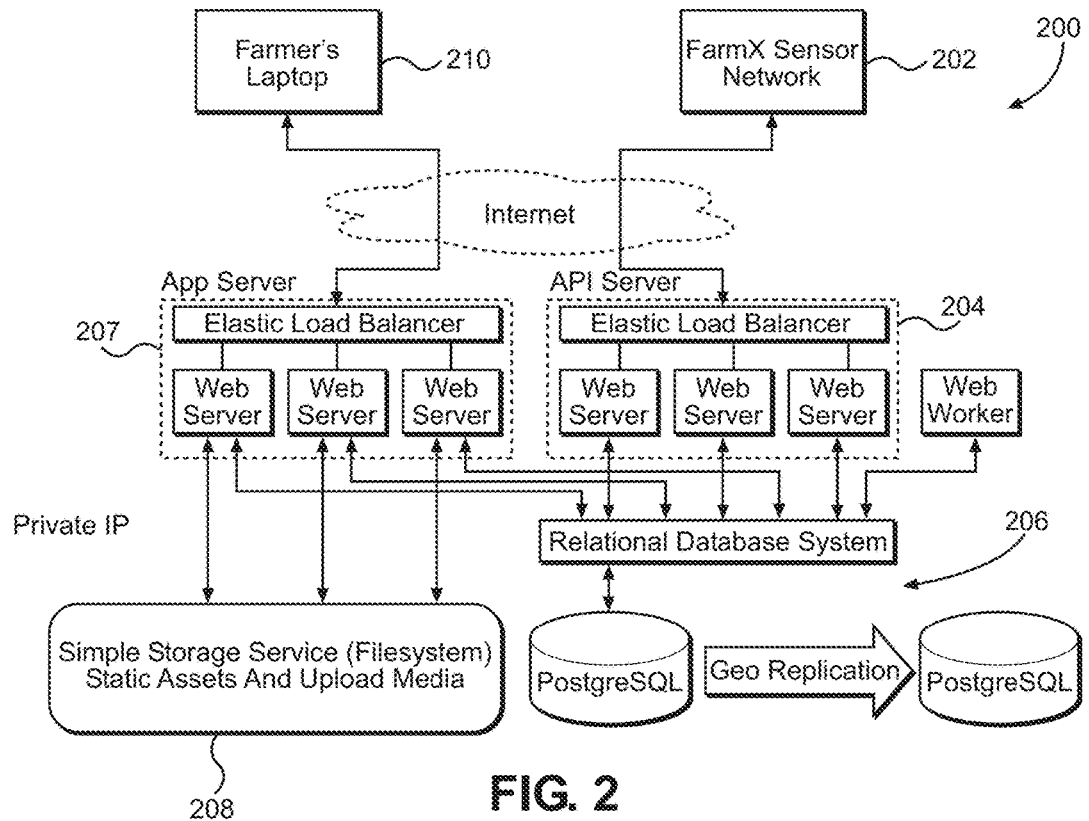
FIG. 2 is a schematic diagram of an example computing architecture that can be used to implement aspects of the present disclosure.

FIG. 2 illustrates an example computing architecture of an example system of the present disclosure, where the system 200 comprises a sensor network (plurality of sensors) 202 that are disposed at a target area of a farm. These sensors are coupled to an API service 204 that stores sensor data in a RDBMS 206. An application server 207 implements the irrigation and pest engines described. The application server 207 can access the sensor data. Analytics, modeling, and so forth can be stored in a filesystem 208. A farmer can access the system and its various analytics and features through a terminal such as laptop 210.

The API service 204 and application server 207 and constituent components can be implemented in a cloud service as noted above.

Figure 3:
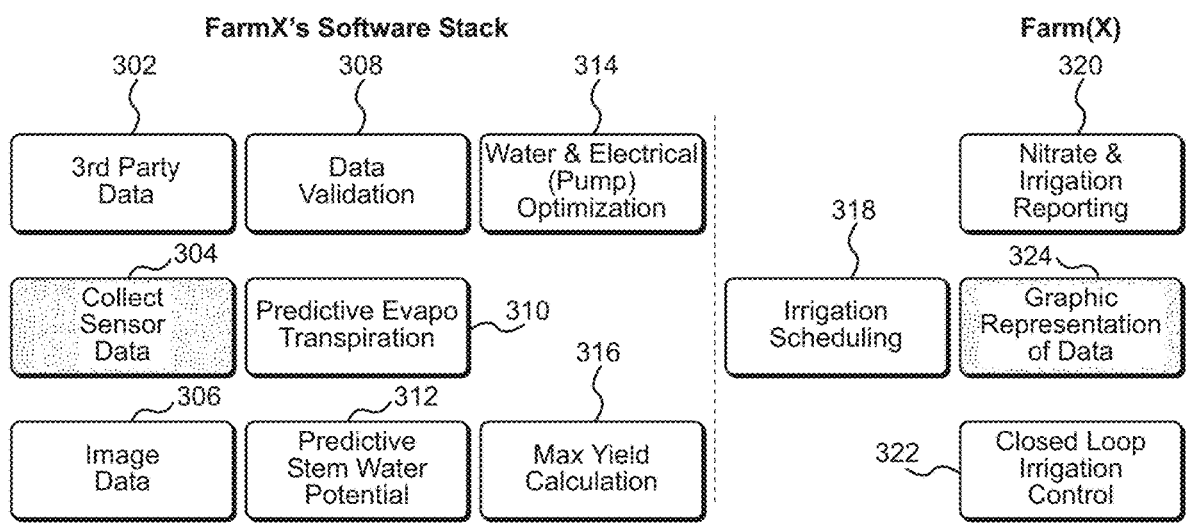
FIG. 3 is a schematic diagram of an example set of modules that are used to process sensor and/or other farm data in accordance with the present disclosure.

FIG. 3 illustrates an example schematic diagram of application modules and logic that can be implemented in the cloud or in a base station of the present disclosure. In some embodiments, third-party data such as weather data, historical crop data, land records, and so forth can be received in module 302. Various sensors collection can occur through module 304 and image data (both low and high altitude) can be obtained through module 306. In some embodiments, sensor data validation can occur through module 308. For example, sensor data from a plurality of similar sensors in a given area can be compared. Large deltas in individual sensor data can indicate an erroneous or errant sensor. Predictive evapotranspiration analytics can be calculated using, for example weather data and plant health sensors that measure real-time evapotranspiration in module 310. Predictive SWP data can be calculated by module 312.

Water pump and electrical optimization can be controlled using module 314. For example, using the various modeling and analytics described herein, the module 314 can be utilized to selectively control operation of pumps and/or valves that control water flow and irrigation to a target area. Max yield predictions for a target area can be implemented through module 316.

In some embodiments, the system can comprise a module that controls irrigation scheduling based on, for example, subterranean sensors, plant health sensors, aerial imagery, and so forth, in module 318. Additional modules such as module 320 can detect and report nitrate and irrigation usage, whereas module 322 can be utilized to provide closed loop irrigation control (in combination with module 314).

The system can also implement various GUIs through a graphical representation module 324. These GUIs allow a farmer or other user to access the functionalities and reporting (as well as alerts) of the system. The user can input various types of information through these GUIs such as field coordinates (target area), crop type, crop genetics and source, historical environmental and/or field instrumentation data, historical and future cultural practices, and historical yield and future yield—just to name a few.

Figure 4:
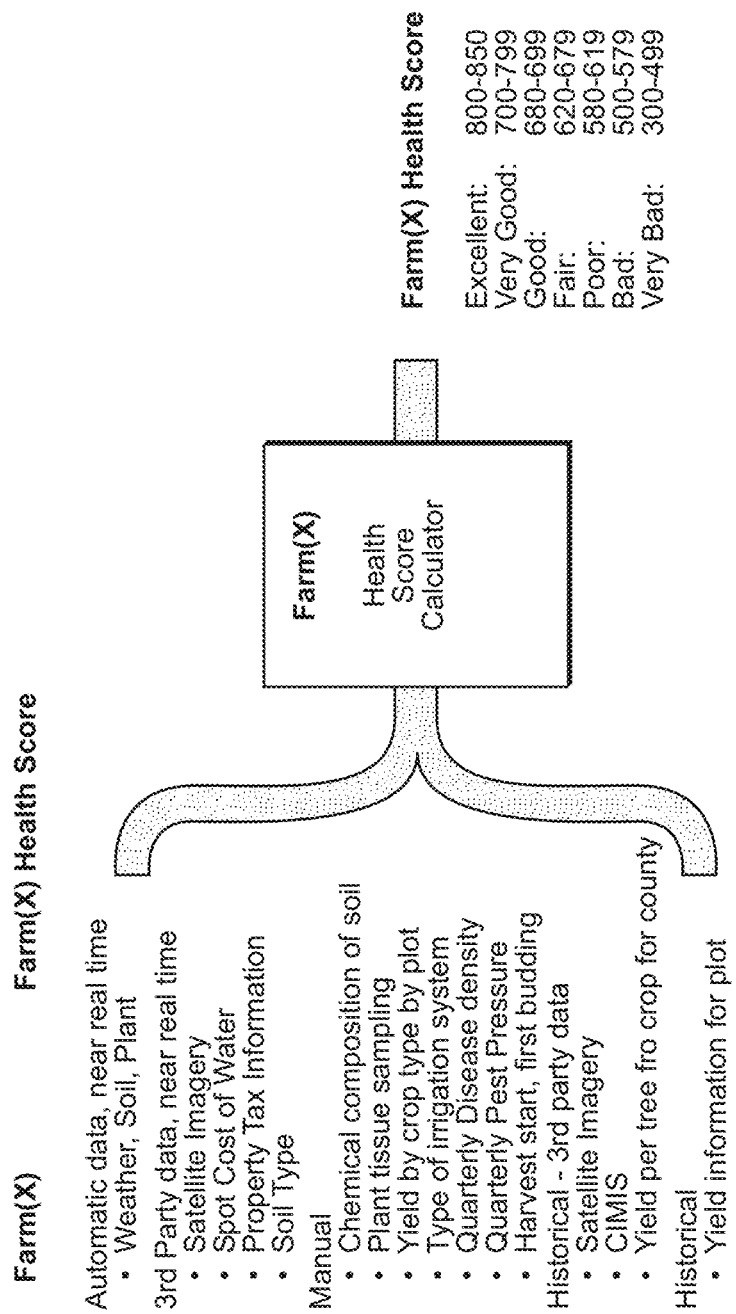
FIG. 4 is an example flow diagram of a process for calculating a health score for a target area.

FIG. 4 illustrates an example schematic diagram for calculating a health score for a target area of a farm. The diagram specifies that various types of automatic or real time data can be obtained from various sensors such as subterranean sensors, weather sensors, and plant health sensors. Third party data can be obtained such as aerial imagery, water cost, property tax, soil type, and so forth. Manually obtained information can be utilized as well such as chemical soil composition, plant tissue sampling, yield by crop, irrigation system specifications, plant disease records, pest records, historical harvest and planting data, and so forth. Further, the analysis can include historical third-party data such as satellite imagery, weather data (historical), and yield per tree for crop and plant type. These various parameters can be analyzed to generate a health score that ranges from 300 to 850, as defined by various ranges or bands.

Figure 5:
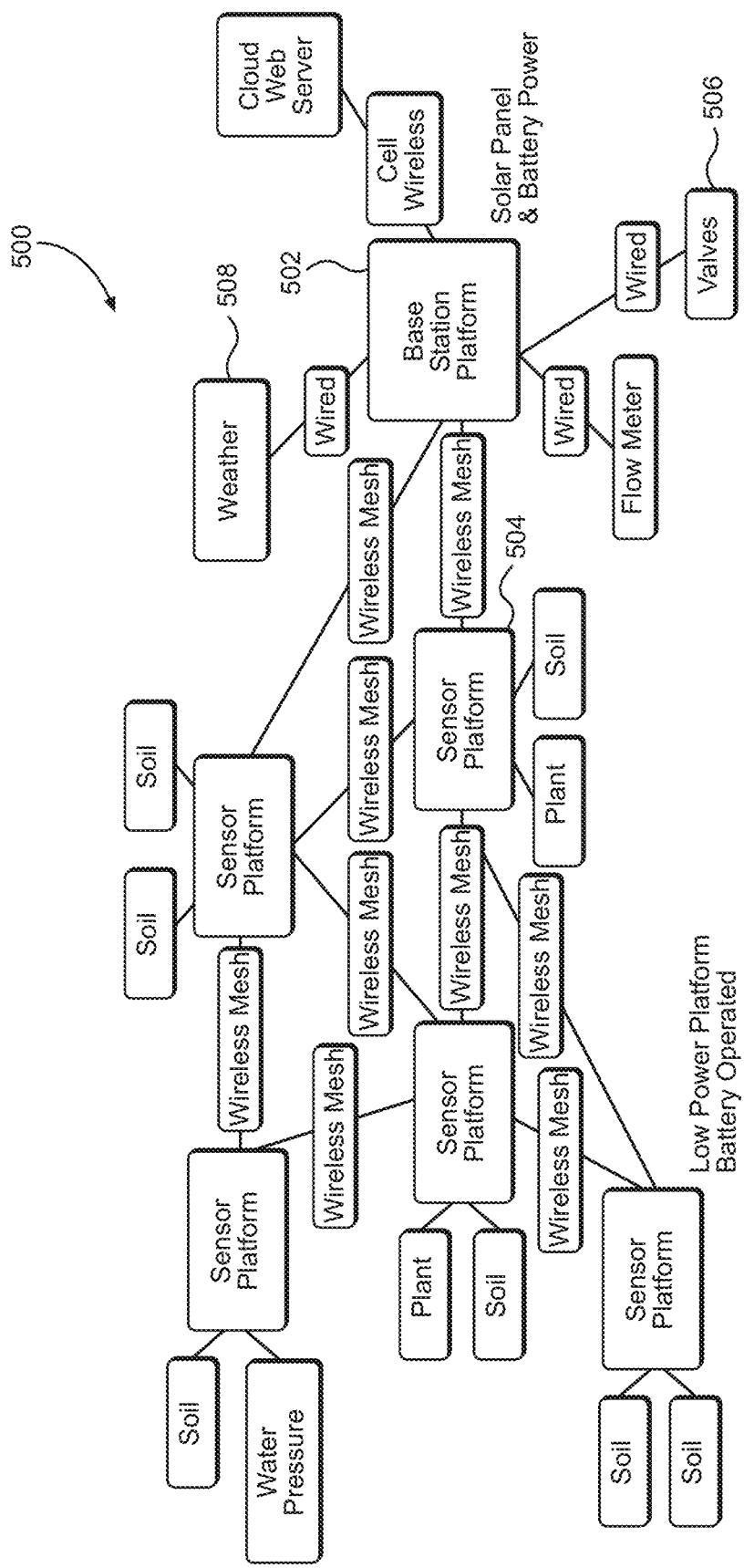
FIG. 5 is an example topology of an example system of the present disclosure.

FIG. 5 is a schematic diagram of an example system implementation with a sensor topology. The topology includes hardware elements deployed on a farm. The topology generally comprises a base station 502, a sensor platform 504 (each having one or more types of sensors), providing closed loop control over mechanical components of an irrigation system such as a pump or valve 506. The topology can comprise additional or fewer components.

According to some embodiments (in view of FIG. 1), the base station 502 connects a mesh network of sensors to a cloud service, and also connects to sensors that need a pole above a canopy (tree or plant tops). The base station 502 can comprise an embedded computer that connects to the mesh network radio, the cell radio, a weather station 508, and so forth. The embedded computer archives sensor data collected on the farm for a period of at least a year, in non-volatile flash memory.

The pole on which the base station is mounted can also implement components for solar power. A weather station 508 can also be coupled to this pole, and a cellular antenna for range and coverage. An example sensor platform 504 can be configured to periodically wake up, read local sensors, share that sensor data over the mesh network, and return to sleep to conserve power. This can be implemented through a controller. Again, sensors that can be coupled to a sensor platform include soil moisture, soil salinity, and soil temperature, plant health, water pressure, weather, flow meter (flow through irrigation system)—just to name a few.

In one embodiment, the sensor platform 504 comprises a micro-controller, that wakes up, reads all attached sensors, sends data over the wireless mesh to the base station (or a redundant base station if transmission unsuccessful), and returns to sleep.

In some embodiments, the sensor platform 504 can wakes up at a periodic interval, generally multiple times a day, and repeat the above process. In one or more embodiments, the sensor platform 504 comprises a magnetometer and a three-axis accelerometer. Output of these components can be used to detect movement or relocation of the sensor platform. Indeed, theft or vandalism is not uncommon on farms. These farms are large tracks of land that have many individuals on the farm throughout the day from outside service agencies (e.g., pest, irrigation, etc.): and hence, protecting equipment with physical security is impractical.

The inclusion of the motion sensor and magnetometer enables sensing either theft, or damage (intentional or not). When the sensor platform moves, it wakes up from sleep, and transmits a broadcast message to others indicating movement. This enables the base station to know when movement of the sensor platform occurred, and also starts tracking the movement by using the mesh network.

One additional benefit is that the system senses when heavy equipment nears the sensor platform (by sensing movement of the sensor platform caused by ground motion), enabling creation of a timestamp of when a major cultural practice specifically occurs. These events can be correlated to operations such as harvest, spraying pesticides, mechanical pruning, and so forth.

The topology also provides for closed loop control by base station access to either a variable speed pump control or control of water valves of an irrigation system.

According to some embodiments, the present disclosure provides systems that can utilize subterranean soil sensors provided at fixed depths in a target area.

A sensor assembly is installed perpendicular to horizon to ensure that water content is traced as it descends through the vadose region of the soil in the target area. Subterranean sensor data is sampled at a fixed duration but staggered by non-overlapping intervals to ensure accurate measurements at each of depth. The subterranean sensors record the volumetric water content with a time stamp at the time of data collection. This data is stored either locally or by means of a cloud-based data backhaul.

During an irrigation event, a volumetric subterranean soil sensor experiences a rapid delta as water permeates the soil. Some portion of the water is absorbed by the roots of an adjacent plant in the target area but a remainder continues to flow through the soil downward. The timing of the soil moisture rate of absorption is affected by the existing moisture in the soil and soil porosity. By subtracting out the soil moisture by the analytics of the system (such as those in the base station), it is possible to characterize the flow rate and therefore the porosity. This calculation is a better proxy for the water available for root uptake and energy required for water uptake because it is the actual soil rate of absorption rather than an approximation based on a soil characterization. Again, the lack of homogeneity in soil creates complications when soil characterization is relied upon, due to fact that soil is rarely homogenous. For example, a depth of soil in an area may have combinations of clay, sand, volcanic, or even stratified layers of types of soil.

The systems and methods herein can determine water content and movement in a horizontal direction in a volume of soil immediately adjacent to a subterranean soil sensor. By being able to determine soil moisture content in radial rings around a sensor, combined with a vertical sampling of soil moisture (and collecting a time series of such measurements) a soil hydrology model can be constructed with higher fidelity than previously possible. These models are referred to as three-dimensional soil moisture topography graphs.

Volumetric water content measured with using the subterranean soil sensors allows for integration of water molecules in a range of influence of a stimulated Radio Frequency (RF) emitted by the subterranean soil sensor(s). As the sensors range is set by an activation voltage that is applied to the broadside antennas, one can increase or decrease the volume of influence measured by changing the voltage applied to the antennas.

A series of measurements are obtained with increasing voltage steps, and from that, a change in water content is related to the change in volume measured. Hence, the system can infer radial water content differences, which further enables a means to calculate a movement of water horizontally around an axis of measurement.

This process further enables the system to subtract out water content near a given subterranean soil sensor that may have a less accurate contribution to the volumetric water content, which may be due, in part, to the hydroscopic nature of the packaging of the sensor.

Figure 6A:
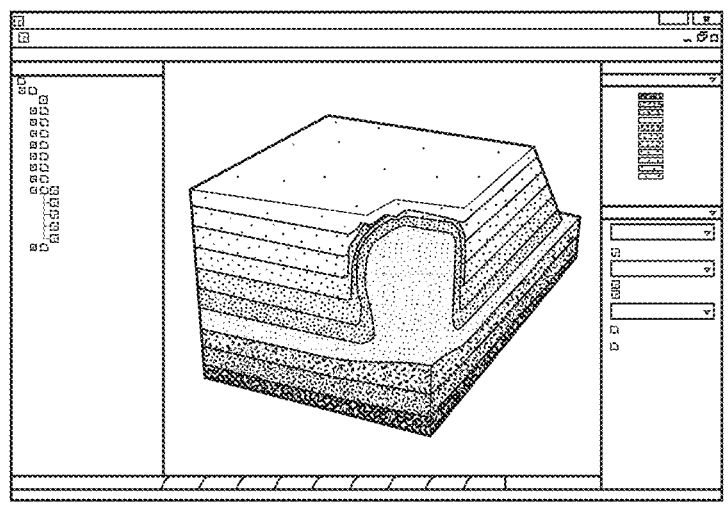
FIGS. 6A-C collectively illustrate hydrology models generate use of subterranean soil sensors, in accordance with the present disclosure.
Figure 6B:
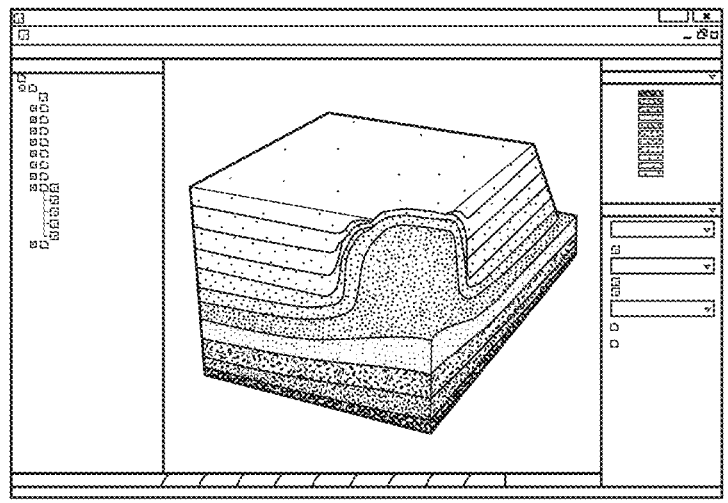
Figure 6C:
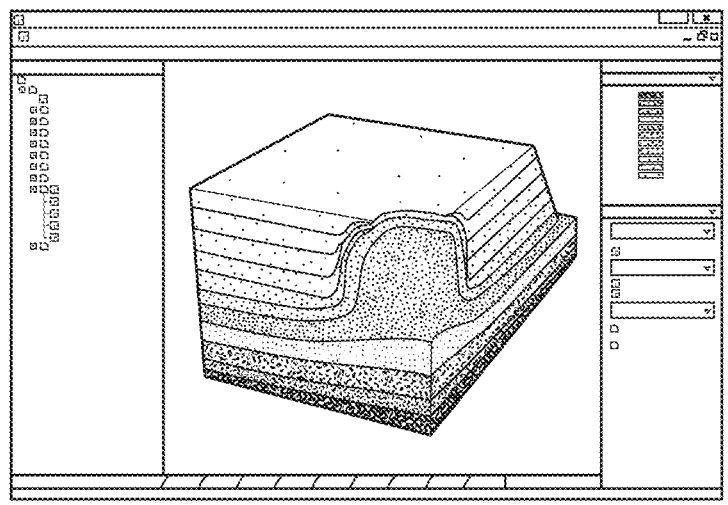

By taking measurements vertically with multiple subterranean soil sensors, horizontally by varying the activation energy on the stimulus antennas, and doing these over a period of time—the system can then construct a representation of a movement of water over time in both vertical and horizontal directions. FIGS. 6A-C are three snapshots of a soil hydrology profile created from the sensor data of vertically arranged subterranean soil sensors at differing depths relative to one another.

In some embodiments, if a subterranean soil sensor is constructed with multiple antennas at each level, and those antennas were directional in nature, and were a subset of a full arc of a circle, the system can infer further resolution on the horizontal movement of water at each depth (e.g., location where the subterranean soil sensors are placed in fixed position in a column of soil.

The combination of these measurement extensions enables a four dimensional representation of soil hydrology, in three-dimensional space, with time as the fourth dimension.

Figure 7:
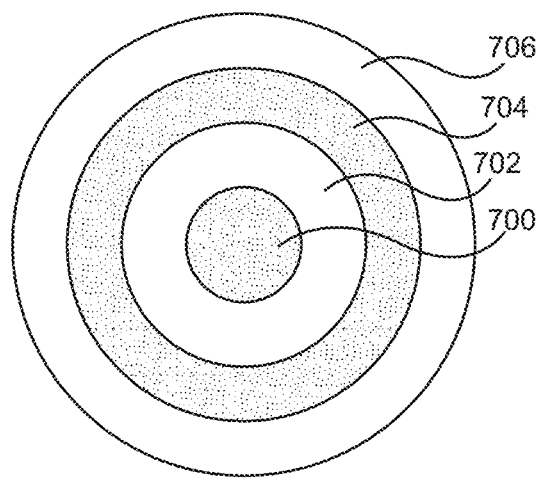
FIGS. 7-9 collectively illustrate various schematic representations of subterranean soil sensors and various voltage-specific and sector measurements.

FIG. 7 illustrates an example of a radial volumetric measurement of water using subterranean soil sensors of the present disclosure. By way of example, readings obtained at three voltages are illustrated, although additional sensors and unique voltages can be utilized.

Again, if a subterranean soil sensor 700 is constructed with multiple antennas at each level (e.g., 702-706), and those antennas were directional in nature, and were a subset of a full arc of a circle, the system can infer further resolution on the horizontal movement of water at each depth (e.g., location where the subterranean soil sensors are placed in fixed position in a column of soil.

The subterranean soil sensor provides for low, mid, and high voltage volume measurements of water in the soil. As water content measured is an integral of all water molecules present in the soil, by subtracting a ring immediately inside the ring being measured, the system (such as the base station) can obtain sectional measurements. When these are coupled with time series measurements, an inference of water movement (e.g., percolation through a column of soil) is determinable.

Figure 8:
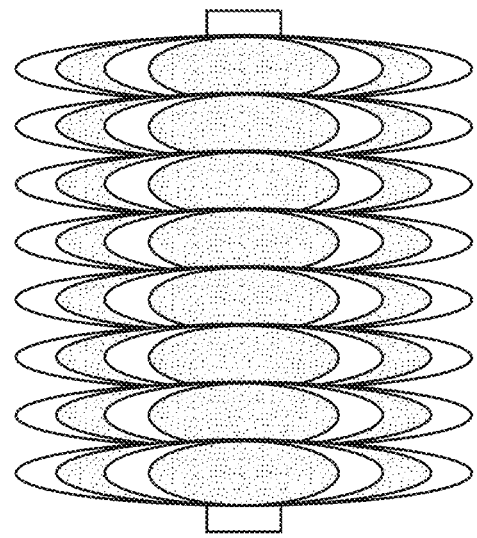
Figure 9:
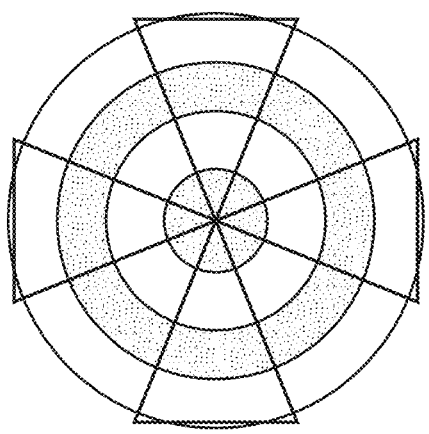

FIG. 8 illustrates a side elevation view of the radial volumetric measurement of FIG. 7. In this example, measurements of moisture in the soil are obtained both horizontally and vertically. In FIG. 9, sectional measurements at each vertical level are illustrated. In this example, eight sections at each vertical are obtained and analyzed. This can be implemented by having eight antennas, each disposed at different radial positions.

Figure 10:
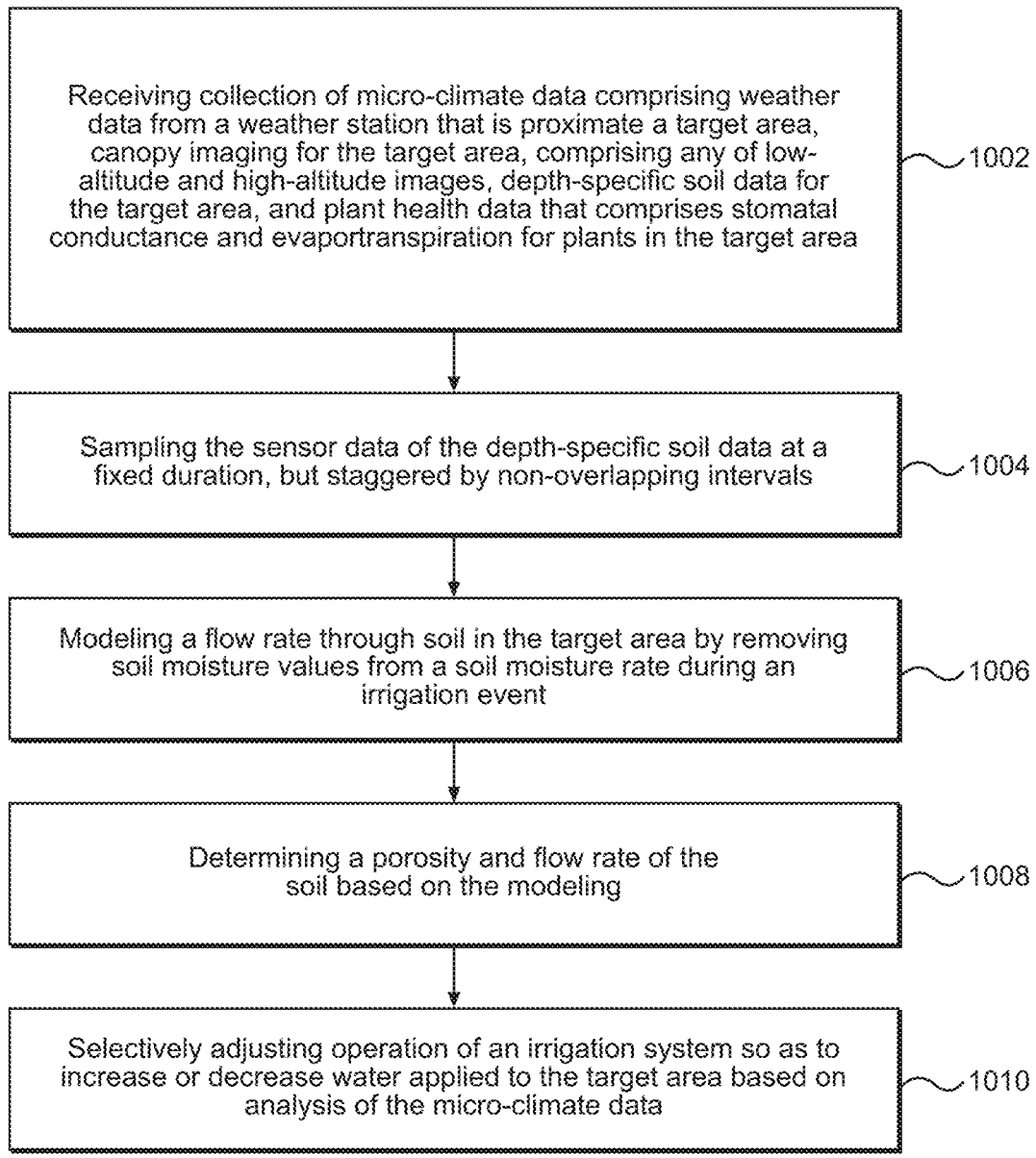
FIG. 10 is a flowchart of an example method for automatic irrigation for a micro-climate area, performed in accordance with the present disclosure.
Figure 11:
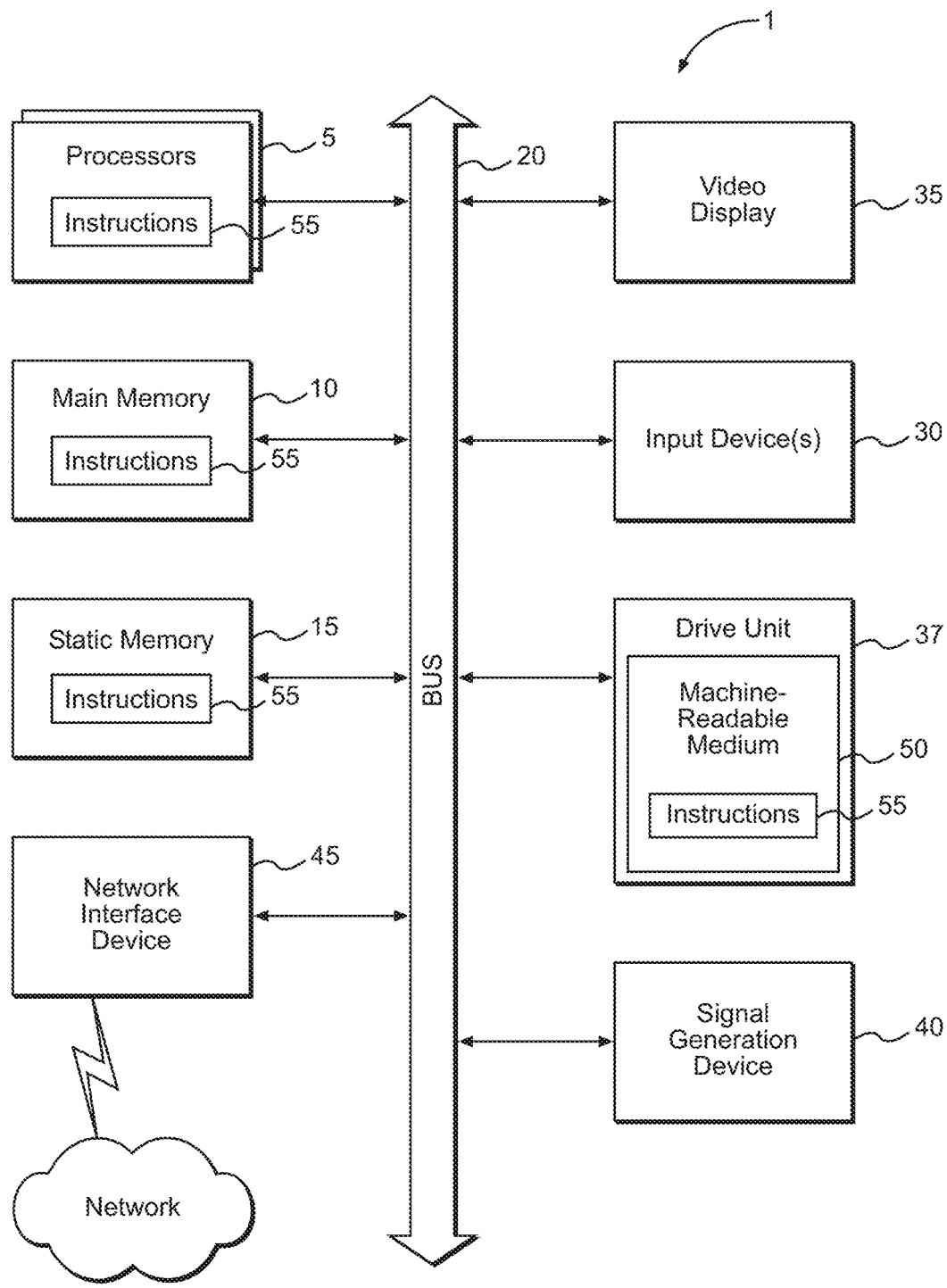
FIG. 11 illustrates an exemplary computing system that may be used to implement embodiments according to the present disclosure.

FIG. 10 is a flowchart of an example method of the present disclosure. The method comprises a step 1002 of receiving collection of micro-climate data comprising weather data from a weather station that is proximate a target area, canopy imaging for the target area, comprising any of low-altitude and high-altitude images, depth-specific soil data for the target area, and plant health data that comprises stomatal conductance and evapotranspiration for plants in the target area.

The method comprises processing the collected information by a step 1004 of sampling the sensor data of the depth-specific soil data at a fixed duration, but staggered by non-overlapping intervals. FIGS. 7-9 collectively illustrate the use of depth-specific subterranean soil sensors.

Next, the method includes a step 1006 of modeling a flow rate through soil in the target area by removing soil moisture values from a soil moisture rate during an irrigation event, and a step 1008 of determining a porosity and flow rate of the soil based on the modeling.

The method also comprises a step 1010 of selectively adjusting operation of an irrigation system so as to increase or decrease water applied to the target area based on analysis of the micro-climate data. This can include, for example, creating irrigation schedules for watering the target area. The valves and/or pumps of an irrigation system can be operated/actuated based on these irrigation schedules.

Figure 14:
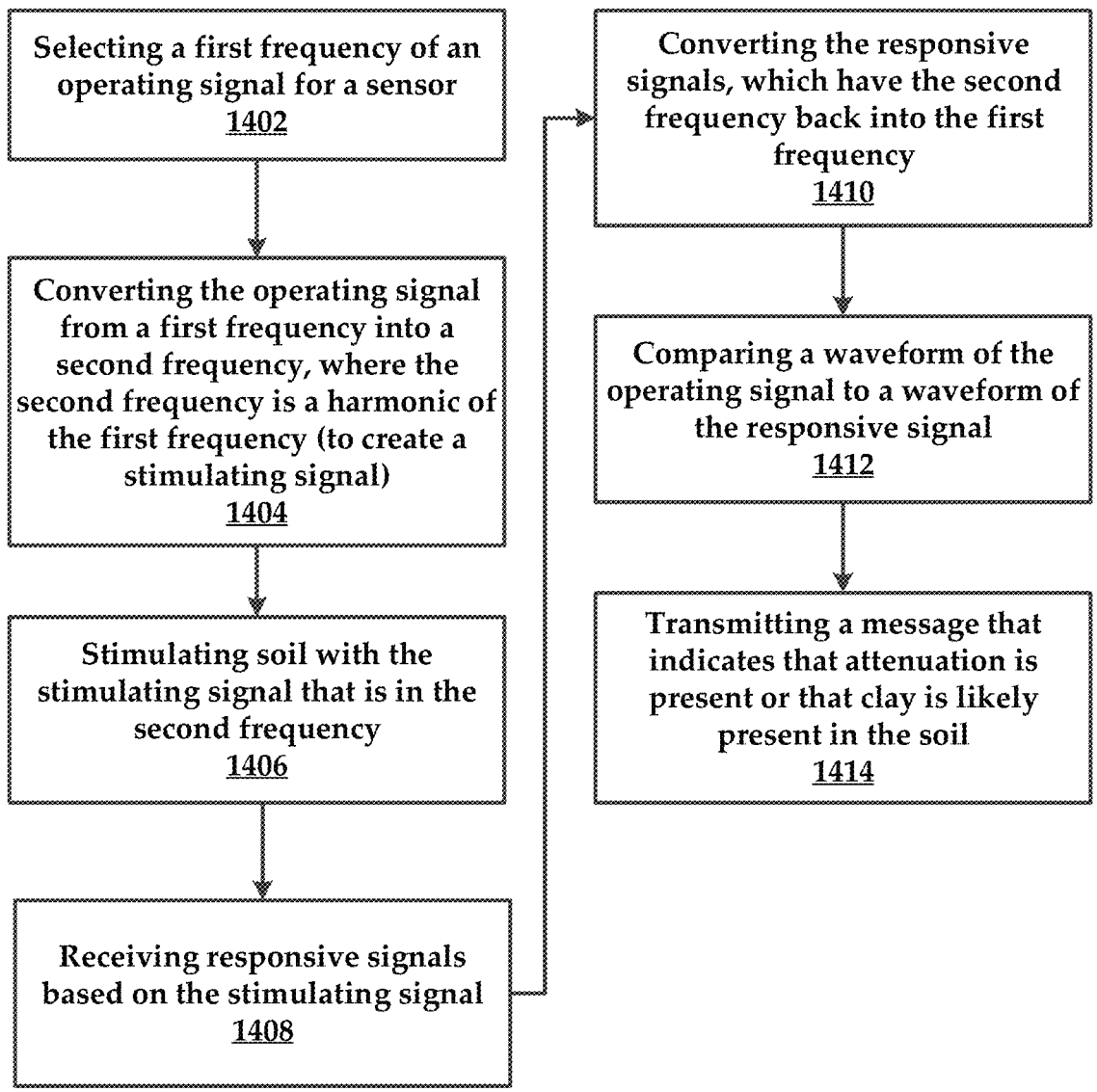
FIG. 14 is a flowchart of a method for determining attenuation in soil, which is attributable to the presence of clay in the soil.

FIG. 14 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The disk drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

According to some embodiments, the systems and methods herein can be configured to detect the presence of clay content in soil. Soil sensor devices of the present disclosure can be used to sense the presence of clay content in soil using harmonic resonance. In general, it will be understood that clay possesses a lattice-type structure comprising cavities and discontinuities that trap a fluid such as air. The density of clay is thus very high and groundwater may have a difficult time passing through clay. It is desirable to determine the presence of clay in soil that may affect groundwater movement through the soil. To be sure, the presence of clay in soil may affect percolation or other soil characteristics that in turn affect how irrigation is controlled. The physical characteristics of clay also make sensing clay with certain frequencies complicated or infeasible. This is due to the fact that clay may resonate with some frequencies or be attenuated with others.

It is further advantageous to design sensors that operate at lower cost. The soil sensor devices disclosed below are adapted to sense clay presence in soil using lower power consumption harmonic sensor circuitry. These harmonic sensor circuits allow for soil stimulation at a first frequency but measurement of a response (e.g., reflective signal) at a second, lower harmonic frequency. In general, the harmonic sensor circuit can generate a first frequency and sense responses to the first frequency at least one harmonic frequency below the first frequency. To be sure, a harmonic is a signal or wave whose frequency is an integral (whole-number) multiple of the frequency of some reference signal or wave. The term can also refer to the ratio of the frequency of such a signal or wave to the frequency of the reference signal or wave.

For example, a harmonic sensor circuit may stimulate the soil at 120 MHz, but measure a sensed signal at a second, lower harmonic frequency, such as 60 MHz (e.g., a second harmonic of 120 MHz). While this has been given as an example, the first and second frequencies may vary as desired with the second frequency being half of the first frequency. Also, while the detection of clay in soil has been disclosed, the circuits, systems, and methods disclosed herein can be adapted to sense the presence of other materials in soil, such as rock. Some embodiments allow for stimulation of soil at various first frequencies, while sampling signals at a lower second harmonic. Thus, a sample of stimulation and response can be measured across a spectrum of frequencies.

Figure 12:
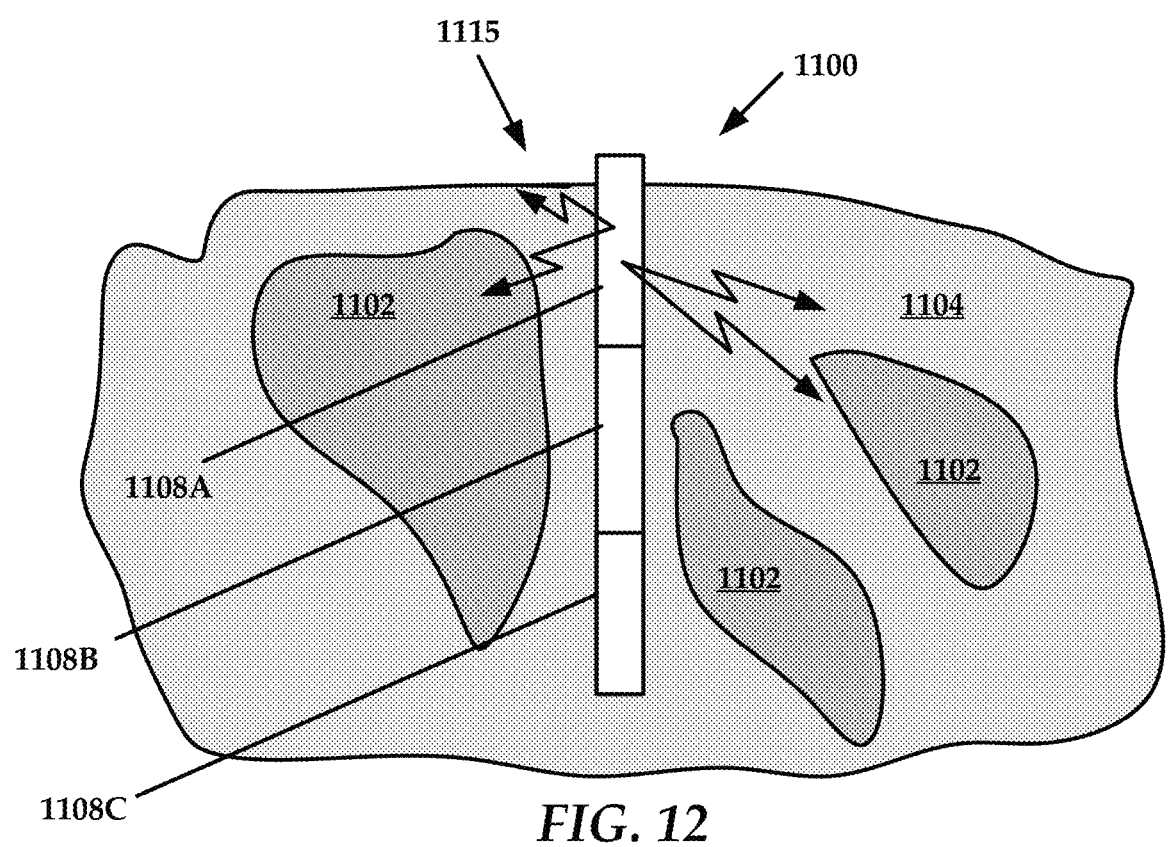
FIG. 12 is a schematic diagram of an environment where aspects of the present disclosure can be practiced.

FIG. 12 is a schematic environment where an example soil sensor device 1100 of the present disclosure can be utilized. In general, the soil sensor device 1100 is adapted to sense clay 1102 within an area of soil 1104 that extends in a radius around the soil sensor device 1100. FIG. 12 is a cross-sectional view of the soil sensor device 1100 within the soil 1104. To be sure, the soil sensor device 1100 can sense in a vertical column pattern as illustrated in FIGS. 7, 8, and 9. Thus, the soil sensor device 1100 can comprise a series of sensor segments, such as sensor segments 1108A, 1108B, and 1108C arranged in a tubular housing 1106. To be sure, fewer or more sensor segments can be used in other embodiments.

Figure 13:
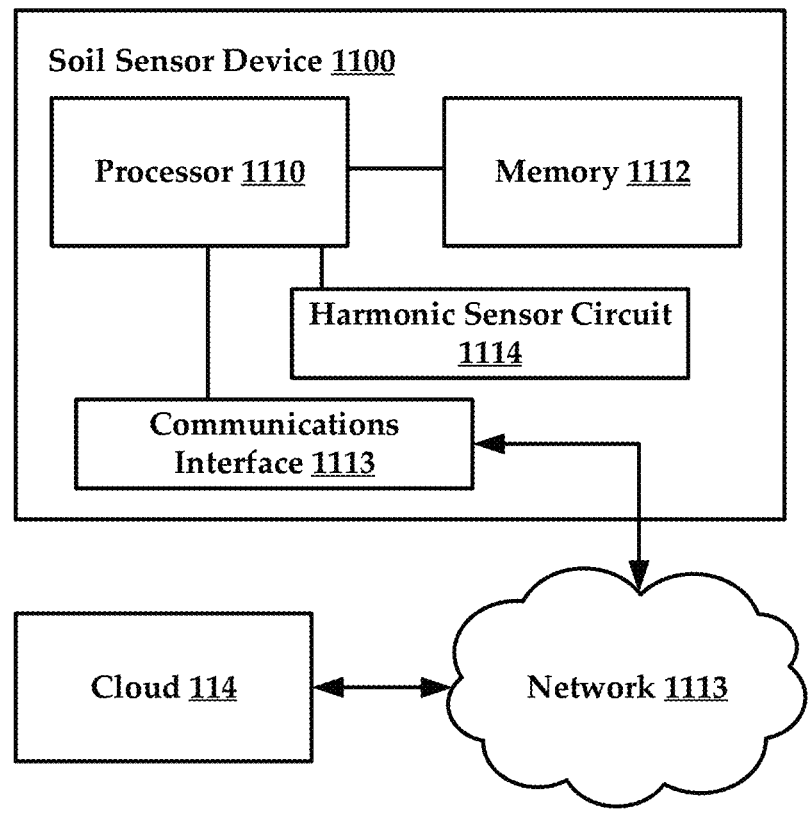
FIG. 13 is a schematic diagram of a device having a harmonic sensor circuit of the present disclosure.
Figure 13:
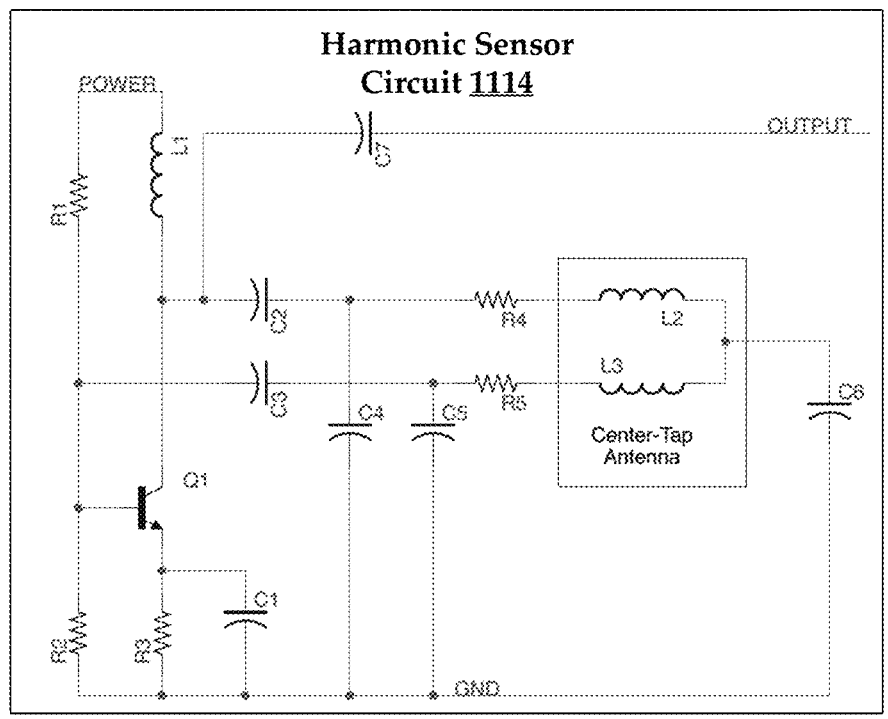

FIG. 13 is a schematic diagram of a device and harmonic sensor circuit 1114. As illustrated in FIG. 13, each sensor segment, such as sensor segment 1108A can comprise a processor 1110, a memory 1112, and a harmonic sensor circuit 1114. In general, the processor 1110 executes instructions store in memory 1112 so as to utilize the harmonic sensor circuit 1114 to detect the presence of clay in the area of soil 1104. In various embodiments, the processor 1110 is coupled with a communications interface 1111 that allows the processor 1110 to transmit data over a network 1113. For example, the processor 1110 can transmit data generated by the harmonic sensor circuit 1114 to a cloud 114 (see FIG. 1).

As noted above, the harmonic sensor circuit 1114 can stimulate soil using harmonic signals 1115 in order to detect clay in soil. The harmonic sensor circuit 1114 can comprise a power input 1116 that includes a parallel resistor (R1) inductor (L1) direct current (DC) arrangement. The power input 1116 is electrically coupled to an oscillator arrangement 1118. In general, the oscillator arrangement 1118 comprises resistors (R2) and (R3), transistor (Q1), and capacitor (C1) arrangement, which is coupled to a ground (GND). The GND is also couple to additional capacitors (C4) and (C5). An antenna 1116 is coupled to the ground GND through a capacitor (C6). The antenna 1116 can comprise two inductors (L2) and (L3). Additional parallel capacitors (C2) and (C3) are included such that capacitor (C3) is electrically coupled to an output 1120.

In operation, the harmonic sensor circuit 1114 is excited to produce frequencies. A ratio of capacitors C2 and C3 is maintained in parallel with C5 to establish a positive feedback value. The processor 1110 is configured to select a ratio that produces first frequency that has a sinusoidal wave that is pure, but also creates a second harmonic frequency that can be used to drive the inductors (L2) and (L3) of the antenna 1116. This creates asymmetry between the first frequency and the second harmonic frequency of the first frequency. The processor 1110 is configured to count in a digital domain the alternating current (AC) coupled output 1118 at a lower frequency (e.g., first frequency). Collectively, the harmonic sensor circuit 1114 is operated as described above so as to allow the oscillator (e.g., parallel capacitors (C2) and (C3)) to operate at a lower frequency overall which reduces operating complexity, operating power, and operating cost. When used in soil, the stimulus (e.g., frequencies) generated are large enough in magnitude to allow for sensing of clay within the soil.

For example, the harmonic sensor circuit 1114 generates a secondary harmonic using an antenna while counting response signals at a first frequency (also referred to as a principle harmonic) that is below the secondary harmonic. The signals emitted by the antenna 1116 relative to the secondary harmonic are absorbed by clay within the soil. This can be due, in part, to a density differential between the clay relative to the surrounding soil. To be sure, clay is substantially denser and more compact material compared to soil, which is a looser and more aggregate material.

The antenna 1116 receives responsive signals from reflected from the soil (which may include clay), but the processor 1110 measures a count of the number of waves at the first frequency. This allows the circuit to operate overall at a lower frequency, power and cost, while allowing for use of an antenna that transmits and receives signals at a higher second harmonic frequency. The processor 1110 is configured to convert the measured signals from the higher second harmonic frequency to the lower first frequency, as well as subsequently counting the signals of the lower first frequency. As noted above, clay selectively resonates at a frequency that is approximately at or above 100 MHz. Thus, the first frequency used is at least approximately 50 MHz, so as to produce a second harmonic frequency of approximately at or above 100 MHz.

When a discrepancy between a count of the signals transmitted and a count of the signals received is present, the processor 1110 can indicate that clay has been detected in the soil. That is, it is assumed that the attenuation of at least a portion of the signals is due to signal absorption by the clay.

FIG. 14 is a flowchart of an example method of the present disclosure. The method can include a step 1402 of selecting a first frequency of an operating signal for a sensor. This operating signal can be used to operate the sensor, such as a soil sensor.

As noted above, the first frequency is approximately at or above 100 MHz. Next, the method includes a step 1404 of converting the operating signal from a first frequency into a second frequency, where the second frequency is a harmonic of the first frequency. In the example provided above, if the first frequency is 50 MHz, the second frequency would be 100 MHz. To be sure, the first frequency is a sinusoidal pattern comprised of periodic waves that serve as a baseline count for the first frequency. The waves of the second frequency are double compared to the first frequency. In sum, the operating signal in the first frequency is converted into a stimulating signal having the second frequency.

Next, the method includes a step 1406 of stimulating soil with the stimulating signal that is in the second frequency. In an example, the soil is stimulated using the converted signal at the second frequency when the stimulating signal is emitted through an antenna of a harmonic sensor circuit.

In various embodiments, the method includes a step 1408 of receiving responsive signals based on the stimulating signal. Next, the method can include a step 1410 of converting the responsive signals, which have the second frequency back into the first frequency. In one embodiment, the method includes a step 1412 of comparing a waveform of the operating signal to a waveform of the responsive signal.

In some embodiments, this can comprise counting waves of the responsive signals in the first frequency. When this wave count is compared to the baseline wave count referenced above, a determination can be made as to whether any of the signals that were emitted were attenuated. If signal attenuation (e.g., differences in compared waveforms) is detected, the method can include a step 1414 of transmitting a message that indicates that attenuation is present or that clay is likely present in the soil. For example, a soil sensor could transmit a message to a cloud service that signal attenuation has been sensed. As noted above, while the stimulation of soil occurs at the second, higher frequency, the sensor circuitry operates and performs analysis at the lower, first frequency. This allows the sensor circuitry to operate at a lower cost than sensor circuitry that operated at a higher frequency. In some embodiments, a magnitude of the attenuation can be correlated to an amount of clay within the soil. Stated otherwise a volume of clay within the soil may correlate to a magnitude of the attenuation.

In various embodiments, the method disclosed above can be performed over a range of frequencies for the first frequency. For example, the method can be performed for frequencies between 50 MHz to 70 MHz, with a stepwise increase of one or more megahertz in each iteration of the method. Thus, an area of soil can be analyzed over a spectrum of frequencies. Each of these frequencies and their corresponding attenuation analysis may indicate the presence of various components in soil, such as water, clay, rock, and so forth. Using correlated attenuation, a user can approximate constituent components of soil.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. Exemplary embodiments were chosen and described in order to best explain the principles of the present disclosure and its practical application, and to enable others of ordinary skill in the art to understand the present disclosure for various embodiments with various modifications as are suited to the particular use contemplated.

Aspects of the present disclosure are described above with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present disclosure. As such, some of the components may have been distorted from their actual scale for pictorial clarity.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing and/or other any other types of manufacturing. For example, some manufacturing processes include three dimensional (3D) printing, laser cutting, computer numerical control (CNC) routing, milling, pressing, stamping, vacuum forming, hydroforming, injection molding, lithography and/or others.

Any and/or all elements, as disclosed herein, can include, whether partially and/or fully, a solid, including a metal, a mineral, a ceramic, an amorphous solid, such as glass, a glass ceramic, an organic solid, such as wood and/or a polymer, such as rubber, a composite material, a semiconductor, a nano-material, a biomaterial and/or any combinations thereof. Any and/or all elements, as disclosed herein, can include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, non-transparency, luminescence, anti-reflection and/or holographic, a photo-sensitive coating, an electronic and/or thermal property coating, such as for passivity, insulation, resistance or conduction, a magnetic coating, a water-resistant and/or waterproof coating, a scent coating and/or any combinations thereof.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings is turned over, then the elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the example terms "below" and "lower" can, therefore, encompass both an orientation of above and below.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method, comprising:
    selecting a first frequency for an operating signal used by a sensor;
    converting the first frequency of the operating signal into a second frequency to create a stimulating signal, the second frequency being a harmonic of the first frequency;
    transmitting the stimulating signal into soil;
    receiving a responsive signal based on the stimulating signal;
    converting the responsive signal at the second frequency back into the first frequency for comparing a waveform of the responsive signal to a waveform of the operating signal at the first frequency;
    comparing a second count of the responsive signal in the first frequency to a first count of the operating signal in the first frequency, the first count and the second count being a number of waves; and
    determining attenuation using the responsive signal, the attenuation corresponding to a difference between the first count and the second count and the attenuation being indicative of clay within the soil.

2. The method according to claim 1, wherein the first frequency is at least approximately 50 MHz.

3. The method according to claim 1, wherein the second frequency is a second harmonic of the first frequency.

4. The method according to claim 1, wherein a volume of clay within the soil correlates to a magnitude of the attenuation.

5. The method according to claim 1, further comprising repeating the method for a range of values for the first frequency.

6. A device, comprising:
    a harmonic sensor circuit that produces an operating signal at a first frequency and emits a stimulating signal at a second frequency that is a harmonic of the first frequency;
    a processor; and
    a memory for storing instructions, the processor executing the instructions to:
        control the harmonic sensor circuit to emit the stimulating signal into soil; and
        determine attenuation of the stimulating signal in the soil based on an analysis of a responsive signal that has been converted back in to the first frequency relative to the operating signal;
    wherein the processor determines attenuation of the responsive signal by:
    converting the responsive signal from the second frequency to the first frequency; and
    comparing a second count of the responsive signal in the first frequency to a first count of the operating signal in the first frequency, the first count and the second count being a number of waves, the attenuation corresponding to a difference between the first count and the second count.

7. The device according to claim 6, further comprising a communications interface, the processor being configured to transmit a message to a cloud service that is indicative of the attenuation.

8. The device according to claim 6, wherein the first frequency is at least approximately 50 MHz.

9. The device according to claim 6, wherein the second frequency is a second harmonic of the first frequency.

10. The device according to claim 6, wherein a volume of clay within the soil correlates to a magnitude of the attenuation.

11. The device according to claim 10, wherein the processor is configured to vary the first frequency over a range of values.

12. A method, comprising:
    converting a first frequency of an operating signal into a second, higher frequency relative to the first frequency to create a stimulating signal;
    transmitting the stimulating signal into soil; and
    determining attenuation based on a comparison of a responsive signal and the operating signal;
    wherein determining attenuation in the responsive signal comprises:
        converting the responsive signal from the second, higher frequency to the first frequency; and
        comparing a second count of the responsive signal in the first frequency to a first count of the operating signal in the first frequency, the first count and the second count being a number of waves, the attenuation corresponding to a difference between the first count and the second count.

13. The method according to claim 12, wherein determining attenuation comprises comparing waveforms of the responsive signal and the operating signal.

14. The method according to claim 12, further comprising selecting the first frequency from a range of frequencies of approximately 50 MHz to 70 MHZ, inclusive.

15. The method according to claim 12, wherein a volume of clay within the soil correlates to a magnitude of the attenuation.

* * * * *